(12) United States Patent
Arakawa et al.

(10) Patent No.: US 7,976,700 B2
(45) Date of Patent: Jul. 12, 2011

(54) WATER SEPARATION UNIT AND FUEL SUPPLY APPARATUS FOR INTERNAL-COMBUSTION ENGINE

(75) Inventors: Miyao Arakawa, Nagoya (JP); Yoshiaki Nishijima, Toyokawa (JP); Masatoshi Kuroyanagi, Kariya (JP); Yoshimichi Kiyozumi, Sendai (JP)

(73) Assignee: Denso Corporation, Kariya (JP)

( * ) Notice: Subject to any disclaimer, the term of this patent is extended or adjusted under 35 U.S.C. 154(b) by 888 days.

(21) Appl. No.: 11/949,857

(22) Filed: Dec. 4, 2007

(65) Prior Publication Data

US 2008/0128350 A1    Jun. 5, 2008

(30) Foreign Application Priority Data

Dec. 4, 2006  (JP) .................................. 2006-326972

(51) Int. Cl.
*F02M 37/22*  (2006.01)
(52) U.S. Cl. ..................................... 210/114; 210/416.4
(58) Field of Classification Search ............... 210/416.4, 210/114, 313
See application file for complete search history.

(56) References Cited

FOREIGN PATENT DOCUMENTS

| JP | 54-97518 | | 7/1979 |
| JP | 63224707 A | * | 9/1988 |
| JP | 64-11608 A | * | 1/1989 |
| JP | 2001-179089 | | 7/2001 |
| WO | WO 2004065780 A1 | * | 8/2004 |

OTHER PUBLICATIONS

English Translation of JP 63-224707, filed Sep. 1988.*
English Translation of WO 2004065780, filed Aug. 2004.*

* cited by examiner

*Primary Examiner* — Terry K Cecil
(74) *Attorney, Agent, or Firm* — Nixon & Vanderhye PC

(57) ABSTRACT

A water separation unit includes a water separation portion. The water separation portion includes a component separation wall, a liquid chamber, and a gas chamber. The separation wall divides the water separation portion between the liquid chamber and the gas chamber. Liquid fuel is led to the liquid chamber. The separation wall includes a separation membrane, which water selectively permeates to be separated from liquid fuel in the liquid chamber. Water passing through the separation wall is temporarily stored in the gas chamber. A fuel supply apparatus supplies liquid fuel in a fuel tank to an internal-combustion engine. The apparatus includes the water separation unit. The water separation portion is disposed integrally in one of the fuel tank and a passage leading from a filler opening into the fuel tank, such that the liquid chamber is located above the gas chamber in a vertical direction of the water separation portion.

12 Claims, 6 Drawing Sheets

WATER SEPARATION UNIT AND FUEL SUPPLY APPARATUS FOR INTERNAL-COMBUSTION ENGINE

CROSS REFERENCE TO RELATED APPLICATION

This application is based on and incorporates herein by reference Japanese Patent Application No. 2006-326972 filed on Dec. 4, 2006.

BACKGROUND OF THE INVENTION

1. Field of the Invention

The present invention relates to a water separation unit and a fuel supply apparatus for an internal-combustion engine.

2. Description of Related Art

Reduction in environment pollution caused by exhaust gas, and a response to resource depletion are formidable challenges to a current transportation system led by automobiles. Development of alternative fuel to conventional hydrocarbon fuel, and improvement of existing fuel such as gasoline and light oil are under consideration as alternative fuels to automotive fuel. For example, alcohol containing fuel, in which inexpensive alcohol is employed, draws attention. Alcohol fuel, in which only alcohol is used, and mixed fuel as a result of mixing alcohol into gasoline are known. Mixed fuel can be employed in an existing engine without modification, which is advantageous on the cost front.

However, there is a problem that water tends to be mixed into alcohol containing fuel. It seems that this water incorporation is caused because, alcohol itself has some amount of water, water is mixed in a process of mixing alcohol into gasoline before a tank truck is loaded with alcohol containing fuel, and water in the air is mixed into alcohol while an automobile is being refueled. In these cases, combustion failure is caused due to water, so that failures such as starting failure, power output decrease, and exhaust deterioration are caused. As well, corrosion in parts in a fuel system may be caused.

A conventional apparatus having a mechanism for draining water is disclosed in JP-U-54-97518. In the mechanism, water, which is separated and settled due to its density difference, is stored in the bottom of a fuel tank, and the stored water is drained by a drain syringe that is received inward of a cap of a refueling inlet. Also in JP-A-2001-179089, a method for separating and removing water is disclosed. According to the method, by using a material having adsorbability only for water and lacking an affinity for fuel as water adsorbent, water mixed into fuel is separated and removed.

However, when the apparatus in JP-U-54-97518 is applied to alcohol containing fuel, alcohol is included in the separated water because alcohol is soluble in water. Thus, alcohol as fuel is disposed of when water is drained, which is uneconomic. When the method in JP-A-2001-179089 is employed, the water adsorbent needs to be regularly replaced due to its capacity degradation, which takes man-hours. Furthermore, a filter for separating the water adsorbent from fuel is needed. Thus, a system for removing water becomes large-scale, which is inconvenient.

SUMMARY OF THE INVENTION

The present invention addresses the above disadvantages. Thus, it is an objective of the present invention to prevent problems caused by combustion failure and corrosion in a fuel system, and to use alcohol included in fuel economically to improve economic efficiency, by removing only water that is mixed in alcohol containing fuel using a simple configuration.

To achieve the objective of the present invention, there is provided a water separation unit for separating water from liquid fuel, which includes the water as impurities. The unit includes a water separation portion. The water separation portion includes a component separation wall, a liquid chamber, and a gas chamber. The component separation wall divides the water separation portion between the liquid chamber and the gas chamber. The liquid fuel is led to the liquid chamber. The component separation wall includes a separation membrane, which the water selectively permeates to be separated from the liquid fuel in the liquid chamber. The water, which passes through the component separation wall, is temporarily stored in the gas chamber.

To achieve the objective of the present invention, there is also provided a fuel supply apparatus for supplying liquid fuel stored in a fuel tank to an internal-combustion engine through a fuel supply passage. The apparatus includes the water separation unit. The water separation portion is disposed integrally in one of the fuel tank and a passage leading from a filler opening for the liquid fuel into the fuel tank, such that the liquid chamber is located above the gas chamber in a vertical direction of the water separation portion. The liquid chamber has an opening, through which the liquid fuel in the fuel tank flows into the component separation wall via the liquid chamber.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
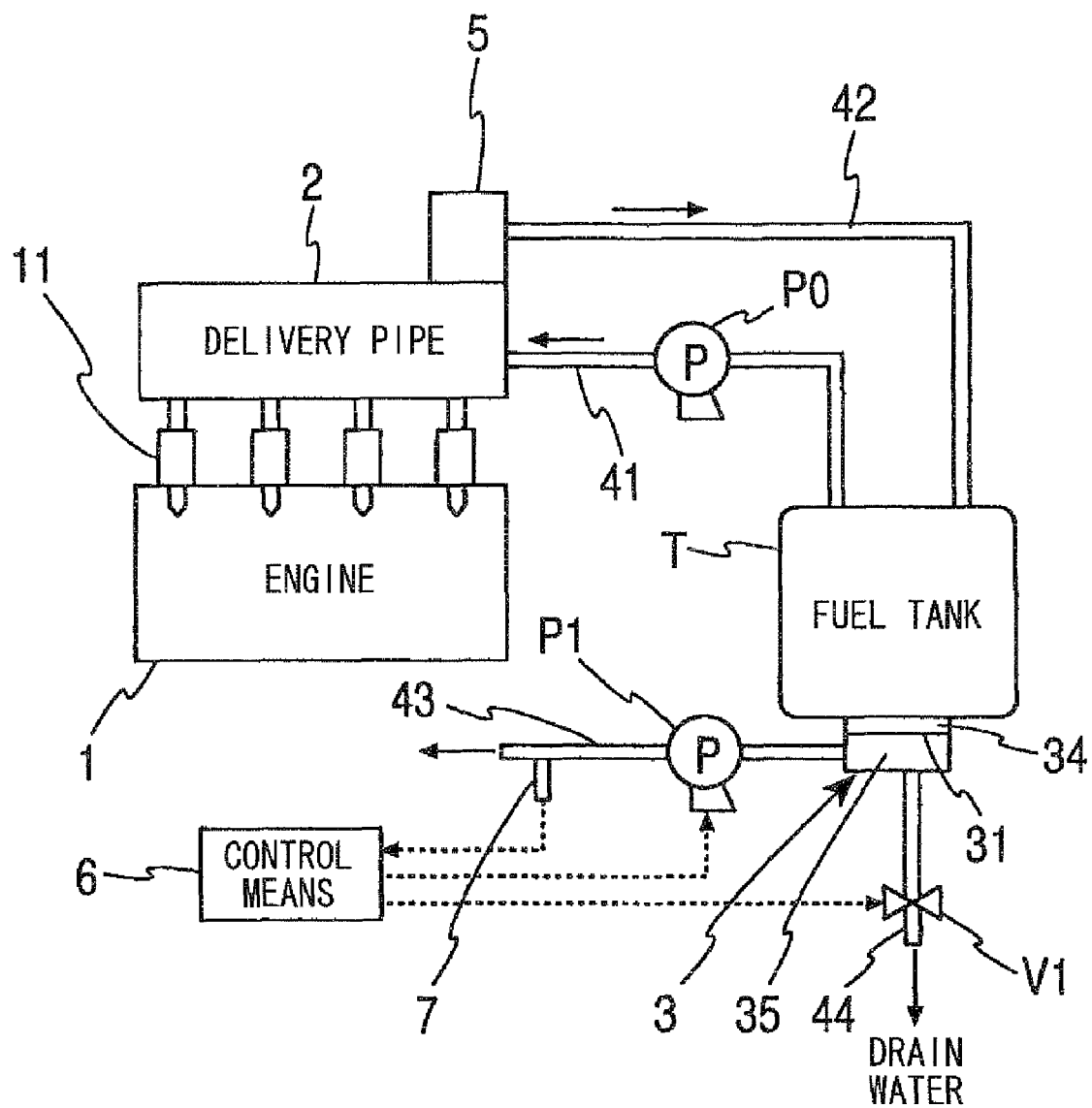
FIG. 1 is a schematic view illustrating an overall configuration of a fuel supply apparatus for an internal-combustion engine according to a first embodiment of the present invention.

A first embodiment of a water separation unit, to which the present invention is applied, and of a fuel supply apparatus for an internal-combustion engine, which has the water separation unit, is described with reference to FIGS. 1 to 5. In FIG. 1, an engine 1, which is internal-combustion engine, is explained as a four-cylinder engine. The engine 1 has four injectors 11, each of which injecting fuel into a combustion chamber in a corresponding cylinder. The injectors 11 are connected to a delivery pipe 2, which is a common fuel supply chamber.

Liquid fuel including water as an impure substance, for example, gasoline fuel into which alcohol is mixed (hereinafter referred to as alcohol mixed gasoline fuel), is stored in a fuel tank T. Alcohol mixed gasoline fuel is supplied to each of the injectors 11 through the delivery pipe 2 after being pressurized through a fuel pump PO disposed in a fuel supply pipe 41. The fuel supply pipe 41 and the delivery pipe 2 constitute a fuel supply passage. Pressure of fuel in the delivery pipe 2 is regulated by a pressure regulator 5. Surplus fuel is returned into the fuel tank T through a fuel return pipe 42, which is connected to the pressure regulator 5.

The water separation unit, which is a characterizing portion of the present invention, is disposed in the fuel tank T. The water separation unit includes a water separation portion 3 formed at the bottom of the fuel tank T integrally with the fuel tank T. The water separation unit has a function of regulating fuel component composition by separating water in liquid fuel contained in the fuel tank T, that is, alcohol mixed gasoline fuel in this example. A negative pressure pipe 43 as a pipe conduit is connected to the water separation portion 3. A decompression pump P1, which serves as a negative pressure generating means, is disposed in the negative pressure pipe 43 to promote water separation by generating negative pressure in the water separation portion 3. The negative pressure pipe 43 also has a water detecting means 7 for detecting water in gas flowing through the negative pressure pipe 43.

Separated water is drained through a drainage pipe 44, which is connected to the bottom of the water separation portion 3. The drainage pipe 44 serving as a water draining means has an electromagnetic valve V1, which is an on-off valve. Timing, with which water is drained through the drainage pipe 44, is controlled by a control means 6. The water detecting means 7 and the decompression pump P1, which are disposed in the negative pressure pipe 43, are connected to the control means 6. The control means 6 determines timing with which the decompression pump P1 is actuated or stopped based on results of detection by the water detecting means 7. Various sensors (not shown) are connected to the control means 6, which controls fuel injection into the engine 1 through the injectors 11 based on engine operating conditions detected by the sensors.

Figure 2:
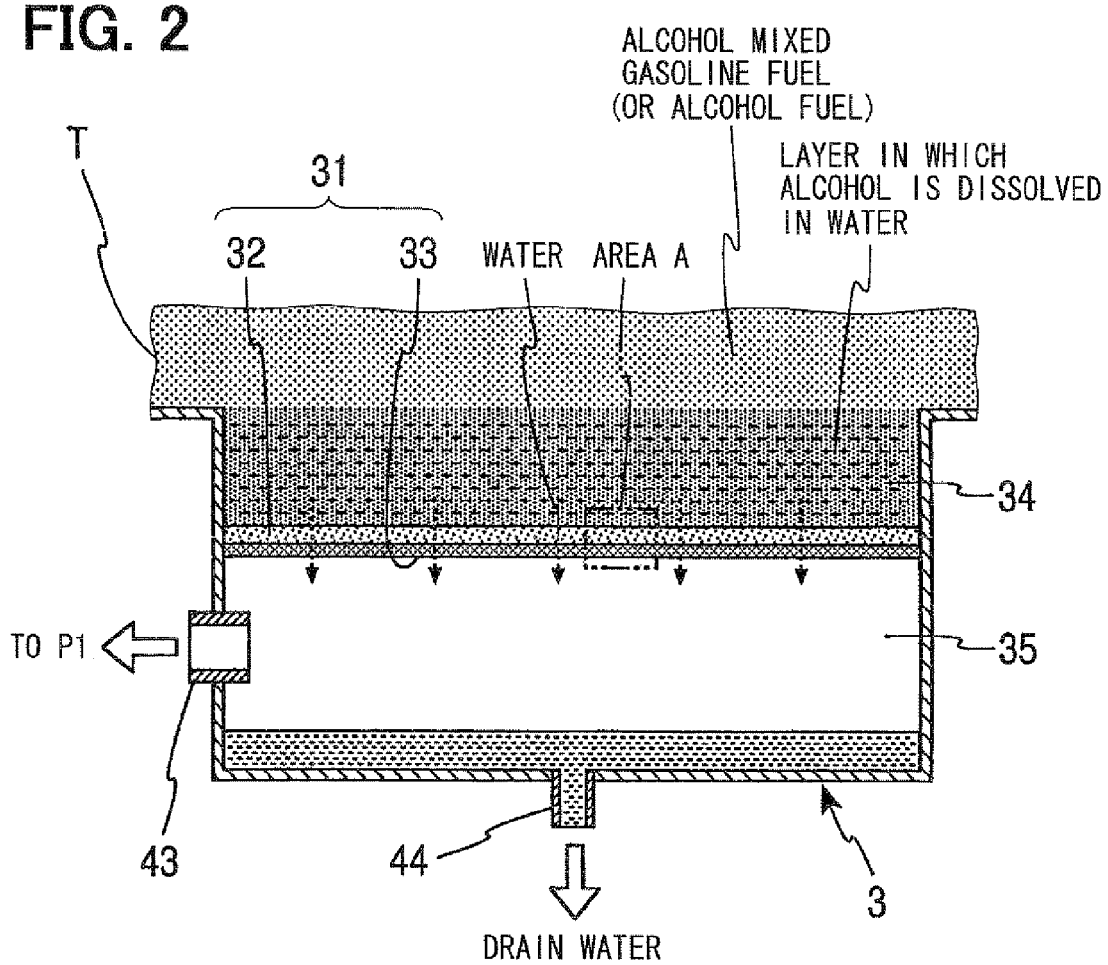
FIG. 2 is a schematic view illustrating an overall configuration of a water separation portion according to the first embodiment.

The water separation portion 3 is described in detail with reference to FIGS. 2 to 4. In FIG. 2, the water separation portion 3 of the water separation unit is formed at the bottom of the fuel tank T integrally with the fuel tank T as a result of caving in a part of a bottom surface of the fuel tank T in a container shape. In a caved-in portion, which constitutes the water separation portion 3, a component separation wall 31 is disposed in a horizontal direction slightly above a vertically intermediate portion of the caved-in portion. The component separation wall 31 divides the water separation portion 3 between upper and lower chambers. The component separation wall 31 includes a porous substrate 32, which serves as a base, and a separation membrane 33, which is stacked on a lower surface of the porous substrate 32. The upper chamber above the component separation wall 31 is a liquid chamber 34. An upper end portion of the liquid chamber 34 opens and communicates with the fuel tank T. The lower chamber is a gas chamber 35. Water, which has passed through the component separation wall 31, is temporarily stored in the gas chamber 35.

When water is mixed into alcohol mixed gasoline fuel in the fuel tank T, fuel is phase-separated. This is because gasoline is not soluble in water. When water is mixed into gasoline, water having higher density is gradually separated, settled, and accumulated on the bottom of the fuel tank T. Meanwhile, because alcohol mixed into fuel is soluble in water, a part of alcohol is dissolved in water, thereby increasing a water layer accumulated on the bottom. When water is drained in this state, an alcohol component, which is dissolved in the water layer, is disposed of, and fuel cannot be utilized effectively.

In the first embodiment, the layer, in which alcohol is dissolved in water accumulated on the bottom of the fuel tank T, is led into the liquid chamber 34 through an opening at the upper end of the water separation portion 3, and then only water is separated at the component separation wall 31. As shown in FIG. 2, the water layer (layer in which alcohol is dissolved in water) is mainly accumulated in the liquid chamber 34, and a layer of alcohol mixed gasoline fuel is formed above the water layer. Height of the water layer varies according to an amount of water mixed into fuel and whether the water separation unit is operated or not. In addition, a small amount of a gasoline component is sometimes mixed in the water layer.

The gas chamber 35 located below the component separation wall 31 has enough space to temporarily store water, which has passed through the component separation wall 31. The negative pressure pipe 43, which leads to the decompression pump P1, opens on a sidewall of the gas chamber 35. When the decompression pump P1 is actuated, the gas chamber 35 is decompressed, so that the separation of water is promoted using a pressure difference between the liquid chamber 34 and the gas chamber 35.

Figure 3A:
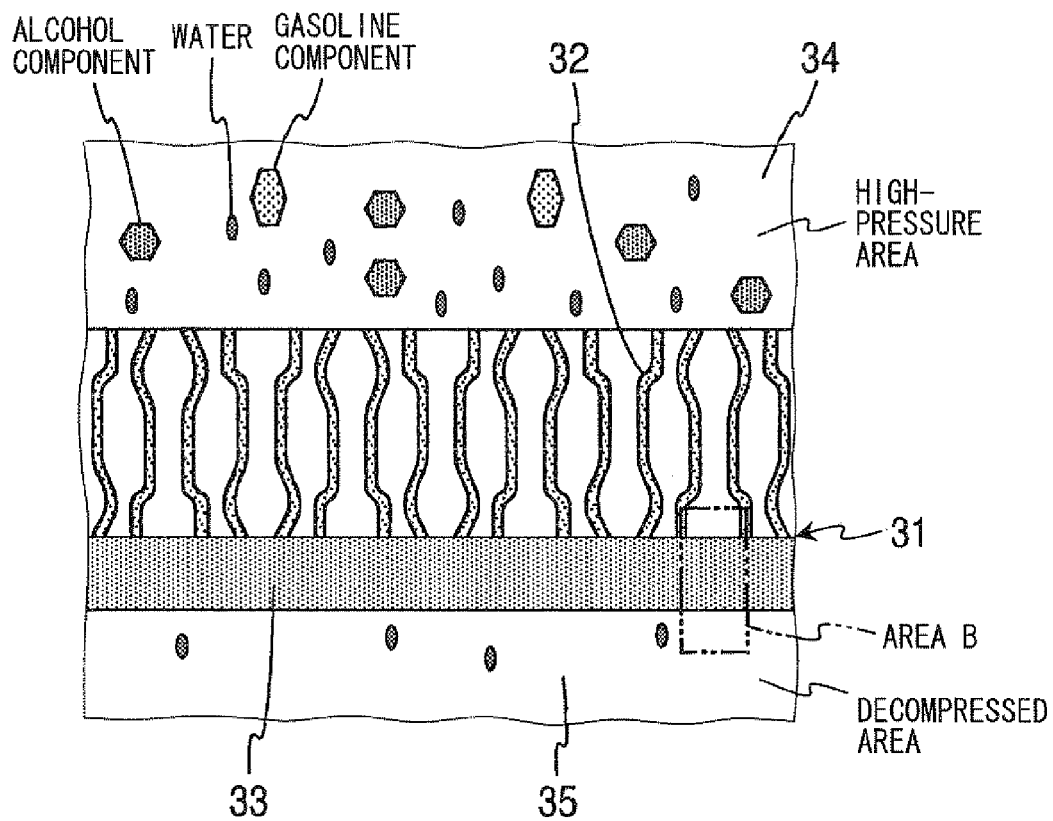
FIG. 3A is an enlarged view of an area A in FIG. 2.

FIG. 3A, which is an enlarged view of an area A in FIG. 2, shows a detailed structure of the component separation wall 31. The porous substrate 32, which serves as a substrate for the component separation wall 31, is a porous layer with a predetermined thickness including, for example, ceramics such as mullite, or metal such as a stainless steel. The porous substrate 32 has a plurality of pores, through which water mixed in fuel is easily able to pass. The pore is normally set to have a size in a range of approximately 10 nm to 100 µm, and may be formed to have a larger size than a pore of the separation membrane 33. When the porous substrate 32 is made of porous ceramics, mullite may be used at a low price as the porous ceramics, so that production costs are kept down. When the porous substrate 32 is made of a porous metal, materials having a mesh structure made of fine metallic wires, or porous materials made of fine metallic fiber may be used as the porous metal. The separation membrane 33 for separating water is thin. When the separation membrane 33 is supported by the porous substrate 32 having pores with their diameters relatively large, the component separation wall 31 has greater strength.

Figure 3B:
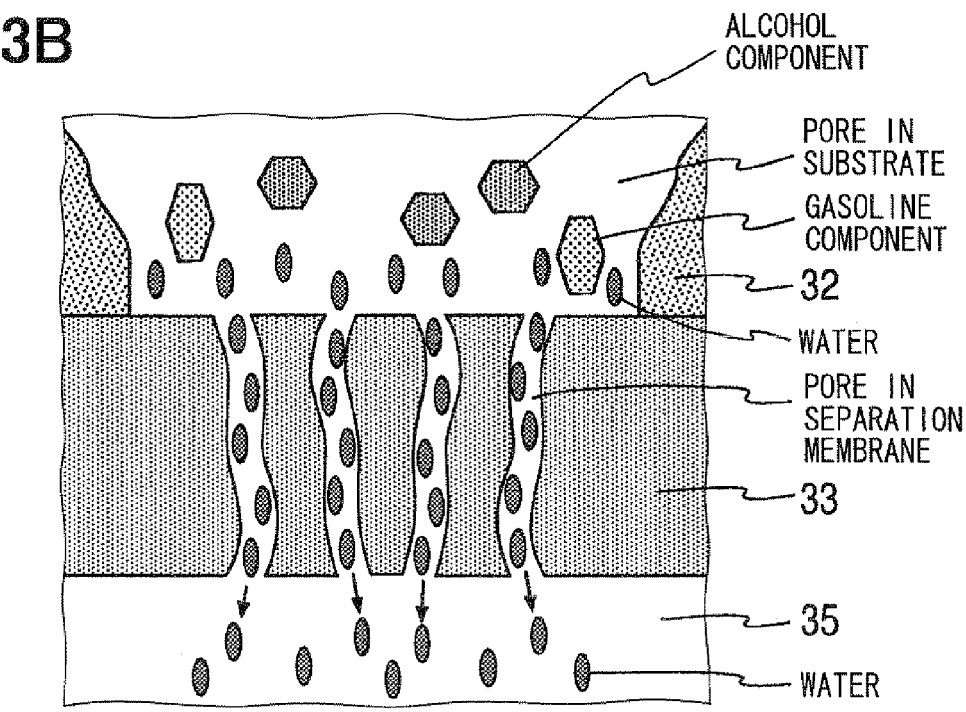
FIG. 3B is an enlarged view of an area B in FIG. 3A.

The separation membrane 33 of the component separation wall 31 is formed to cover the entire lower surface of the porous substrate 32. Water selectively permeates the separation membrane 33 and is separated. FIG. 3B, which is an enlarged view of an area B in FIG. 3A, shows a detailed structure of the separation membrane 33. As shown in FIG. 3B, the separation membrane 33 has pores, which are set to be smaller than the alcohol and gasoline components included in the water layer in the liquid chamber 34, and to be larger than a water molecule. Using molecular sieving through the pores and an adsorbability difference, only water is separated from the water layer including the alcohol or gasoline components.

A zeolite membrane such as silicalite (MFI zeolite: processed to be hydrophilic), for example, is suitably used as the separation membrane 33. LTA, ANA, MER, PHI, FAU, ERI, and BEA (processed to be hydrophilic) may be also used as the zeolite membrane. These zeolite membranes have varying diameters (e.g., approximately 0.3 to 0.9 nm) of pores according to the type of the zeolite membrane. Crystal growth by hydrothermal synthesis may be used as a means for forming the separation membrane 33 on the lower surface of the porous substrate 32. When a wall thickness of the porous substrate 32 is in a range of approximately 0.5 to 3 mm, for example, the separation membrane 33 may have a thickness of approximately 500 nm to 40 μm.

Figure 4:
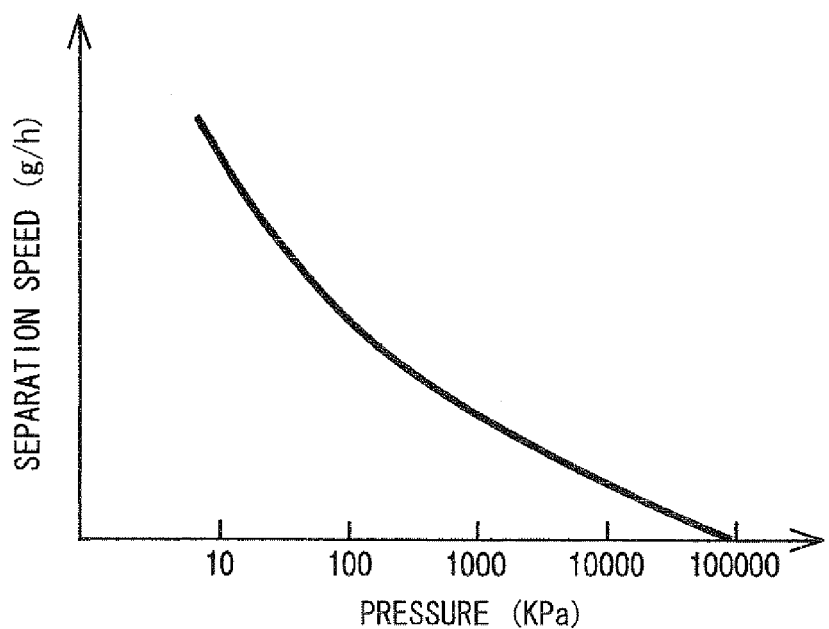
FIG. 4 is a graph illustrating a pressure characteristic during water separation by the water separation portion.

FIG. 4 is a graph showing a relationship between water separation performance of the component separation wall 31 and pressure. As shown in the graph, when pressure in the gas chamber 35 decreases, a water separation speed increases, so that the separation performance is improved. The control means 6 operates the decompression pump P1 disposed in the negative pressure pipe 43 to decompress the gas chamber 35 located below the component separation wall 31. Pressure in the liquid chamber 34, which is located above the component separation wall 31, is high relative to the gas chamber 35 due to pressure of fuel in the fuel tank T. Accordingly, a predetermined pressure difference is generated between the gas chamber 35 and the liquid chamber 34. By controlling the decompression pump P1, water in the water layer passes through the component separation wall 31 using the difference between pressures in the chambers above and below the component separation wall 31. As a result, water in the liquid chamber 34 is separated and accumulated in the gas chamber 35. When the decompression pump P1 is stopped, the difference between pressures in the chambers above and below the component separation wall 31 is made small, and a water separation process is nearly stopped.

Using FIG. 5, workings in water separation and drainage processes executed in the control means 6 are described with reference to FIGS. 1 to 3. Step 1 (S1) to step 4 (S4) are processing that corresponds to a determining means. At S1, a travel distance, which has been traveled since the previous water separation process is performed, is measured. At step 2 (S2), it is determined whether the travel distance measured is equal to or larger than a predetermined distance A. When it is determined that the travel distance is equal to or larger than the predetermined distance A (Yes), control proceeds to step 5 (S5). When it is determined that the travel distance is not equal to or larger than the predetermined distance A (No), control returns to S1. The predetermined distance A is set at a distance, based on which water is estimated to be accumulated in the fuel tank T to the extent that it needs to be drained again after the previous water separation process, for example, 200 km.

At step 3 (S3), an increase in an amount of fuel stored in the fuel tank T after the previous measurement is measured. At S4, it is determined whether the fuel increase measured is equal to or larger than a predetermined value B. When it is determined that the fuel increase is equal to or larger than the predetermined value B (Yes), control proceeds to S5. When it is determined that the fuel increase is not equal to or larger than the predetermined value B (No), control returns to S3. The predetermined value B is set to be equal to or larger than a fuel amount, based on which it is determined that fuel is fed to the extent that water needs to be drained. That is, the predetermined value B is set at 10 L, for example.

S5 to step 8 (S8) are processing as a water separation performing means. At S5, the decompression pump P1 disposed in the negative pressure pipe 43 is actuated to perform the water separation in the water separation portion 3 in the fuel tank T. Accordingly, negative pressure is generated in the gas chamber 35 of the water separation portion 3, which communicates with the negative pressure pipe 43, and the pressure difference between the liquid chamber 34 and the gas chamber 35 is made large. As a result, only water in the water layer including the alcohol component in the liquid chamber 34 passes through the porous substrate 32 and the separation membrane 33 of the component separation wall 31 in this order, and is separated in the gas chamber 35. Water is accumulated on the bottom of the gas chamber 35.

At step 6 (S6), water in a gas flow flowing through the negative pressure pipe 43 is measured by the water detecting means 7 disposed in the negative pressure pipe 43. At step 7 (S7), it is determined whether the measured water is equal to or smaller than a predetermined value C. When it is determined that the water is equal to or smaller than the predetermined value C (Yes), control proceeds to S8. When it is determined that the water is not equal to or smaller than the predetermined value C (No), control returns to S6. The predetermined value C is set to be equal to or smaller than a water amount, based on which it is determined that water draining is nearly completed. The predetermined value C is set at 100 ppm, for example.

At S8, the decompression pump P1 is stopped. At step 9 (S9), a travel distance after the previous water drainage process is measured. S9 to step 11 (S11) are processing as a water drainage performing means. At step 10 (S10), it is determined whether the travel distance measured at S9 is equal to or larger than a predetermined distance D. When it is determined that the travel distance is equal to or larger than the predetermined distance D (Yes), control proceeds to S11. When it is determined that the travel distance is not equal to or larger than the predetermined distance D (No), control returns to S9. The predetermined distance D is set at a distance, based on which water is estimated to be accumulated in the gas chamber 35 to the extent that water needs to be drained again after the previous water drainage process. The predetermined distance D is set at 1000 km, for example.

At S11, the electromagnetic valve V1 disposed in the drainage pipe 44, which is connected to the bottom of the gas chamber 35, is opened to drain water in the gas chamber 35. This state is continued for a predetermined time E, and then the electromagnetic valve V1 is closed to stop the water drainage process. The predetermined time E is set to be equal to or longer than a time, based on which it is determined that the water drainage is nearly completed. The predetermined time E is set at five minutes, for example.

In the first embodiment, the process by the water separation portion 3 is performed regularly or after refuel, to separate and drain only water in the fuel tank T. As a result, failures such as deterioration in combustion performance, exhaust deterioration, and corrosion in a fuel system due to the incorporation of water into fuel are restricted, and also discharge of the alcohol component mixed into the water layer is prevented to use fuel economically.

By providing the water separation portion 3 near the fuel tank T, in which liquid fuel of the engine is stored, water in liquid fuel can be separated immediately after the refuel. Meanwhile, water separated and settled due to its density is first led into the liquid chamber 34 located above, and then permeates the component separation wall 31. Accordingly, water can be efficiently separated to be stored in the gas chamber 35 located below.

Figure 6:
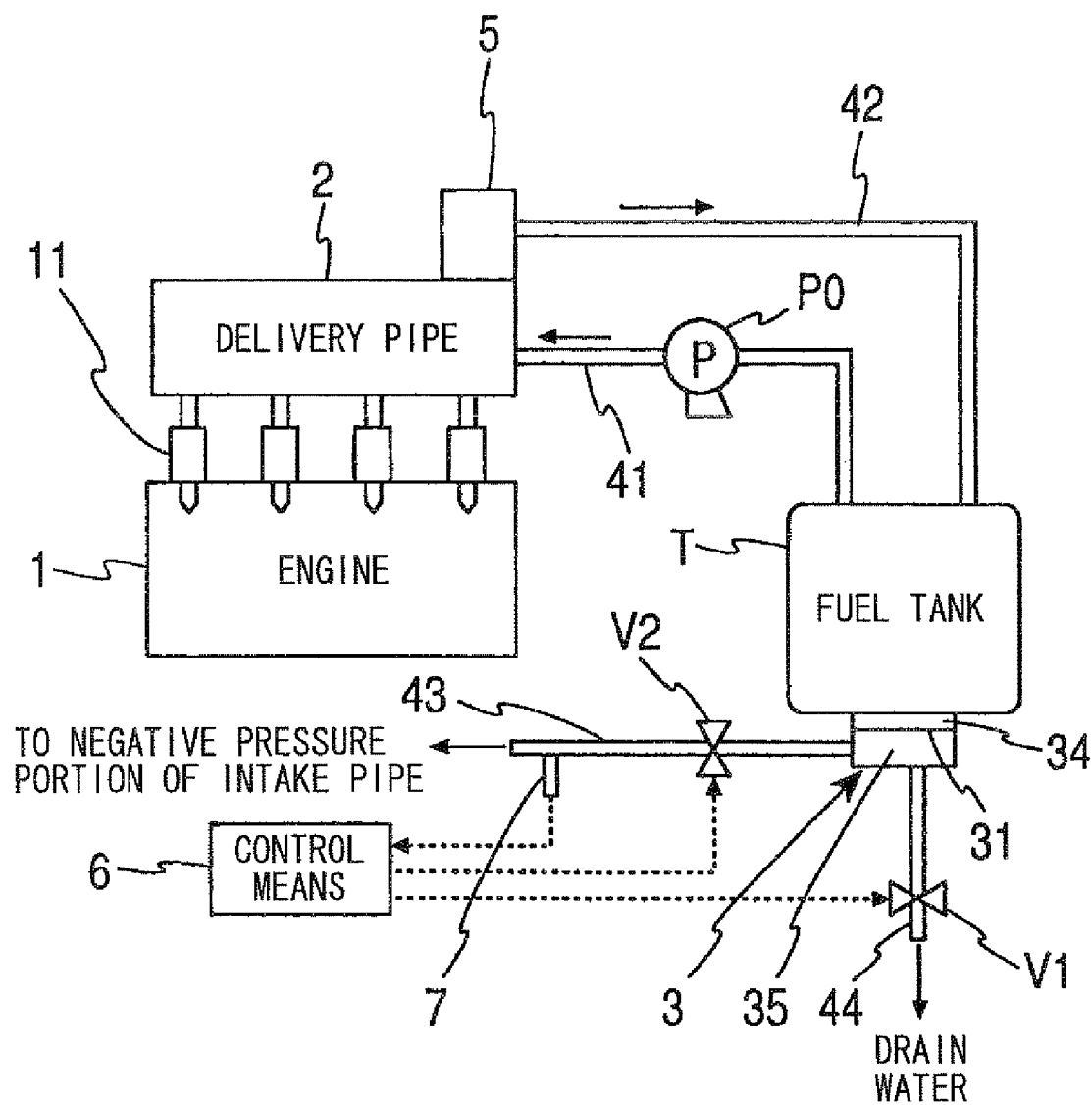
FIG. 6 is a schematic view illustrating an overall configuration of a fuel supply apparatus for an internal-combustion engine according to a second embodiment of the present invention.

In the first embodiment, the water separation portion 3 is disposed at the lowest portion of the fuel tank T, in which water that is heavier than a fuel component tends to be accumulated. However, the arrangement of the water separation portion 3 is not limited to the lowest portion of the fuel tank T. The water separation portion 3 may be disposed at other areas, for example, at a lower portion of the fuel tank T in which water tends to be accumulated, or near an area immediately below a filler opening because of moisture absorption during the refuel. In the first embodiment, the decompression pump P1 is used as the negative pressure generating means for generating negative pressure in the gas chamber 35 of the water separation portion 3. However, other means may be employed, which is shown in FIG. 6 as a second embodiment of the present invention.

A configuration in which a water separation portion 3 is provided on the bottom of a fuel tank T, and a basic structure of the water separation portion 3 in the second embodiment are similar to the first embodiment, and the description is omitted. In the second embodiment, instead of disposing the decompression pump P1 (FIG. 1) in a negative pressure pipe 43, which is connected to a gas chamber 35 of the water separation portion 3, an electromagnetic valve V2, which is an on-off valve, is disposed in the negative pressure pipe 43 as the negative pressure generating means (FIG. 6). Furthermore, the negative pressure pipe 43 is connected to a negative pressure portion of an engine intake pipe (not shown). The electromagnetic valve V2 is controlled by a control means 6. The other configurations are similar to those of the first embodiment.

Accordingly, the electromagnetic valve V2 is opened by a command from the control means 6 to guide negative pressure in the intake pipe to the gas chamber 35 through the negative pressure pipe 43. In this manner as well, the water separation is promoted by making large a difference between pressures in chambers above and below a component separation wall 31 in the water separation portion 3, and similar effects to the first embodiment are produced. Also, since the decompression pump P1 is unnecessary, the configuration is simplified and the apparatus is downsized.

Figure 7:
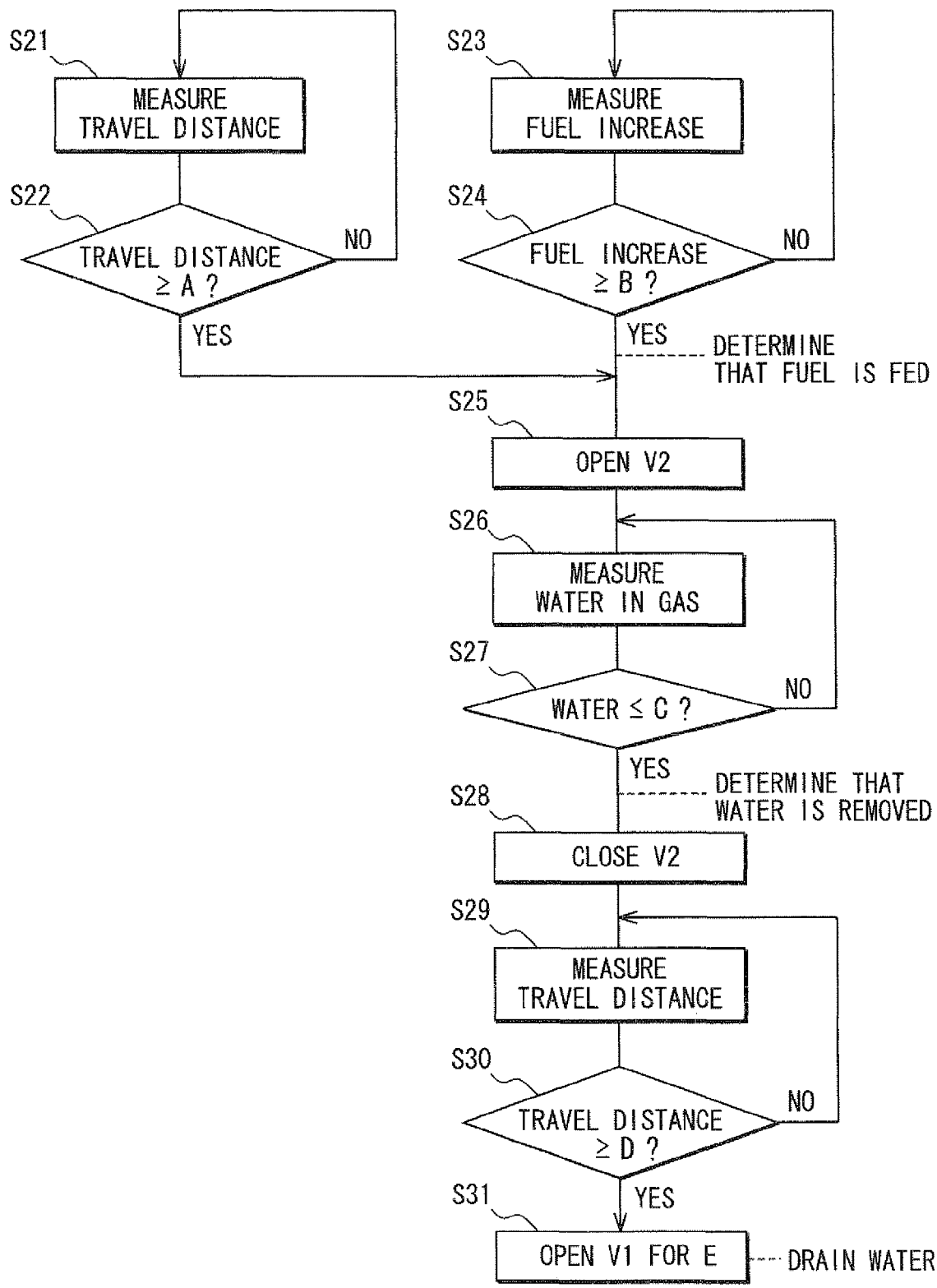
FIG. 7 is a flowchart illustrating workings of a control means according to the second embodiment.

FIG. 7 shows workings in water separation and drainage processes executed in the control means 6 of the second embodiment. As shown in FIG. 7, step 21 (S21) to step 24 (S24) are processing as the determining means, which corresponds to S1 to S4 in FIG. 5. At S21, a travel distance, which has been traveled since the previous water separation process is performed, is measured. At step 22 (S22), it is determined whether the travel distance measured is equal to or larger than a predetermined distance A (e.g., 200 km). When it is determined that the travel distance is equal to or larger than the predetermined distance A (Yes), control proceeds to step 25 (S25). When it is determined that the travel distance is not equal to or larger than the predetermined distance A (No), control returns to S21.

At step 23 (S23), an increase in an amount of fuel stored in the fuel tank T after the previous measurement is measured. At S24, it is determined whether the fuel increase measured is equal to or larger than a predetermined value B (e.g., 10 L). When it is determined that the fuel increase is equal to or larger than the predetermined value B (Yes), control proceeds to S25. When it is determined that the fuel increase is not equal to or larger than the predetermined value B (No), control returns to S23.

Figure 5:
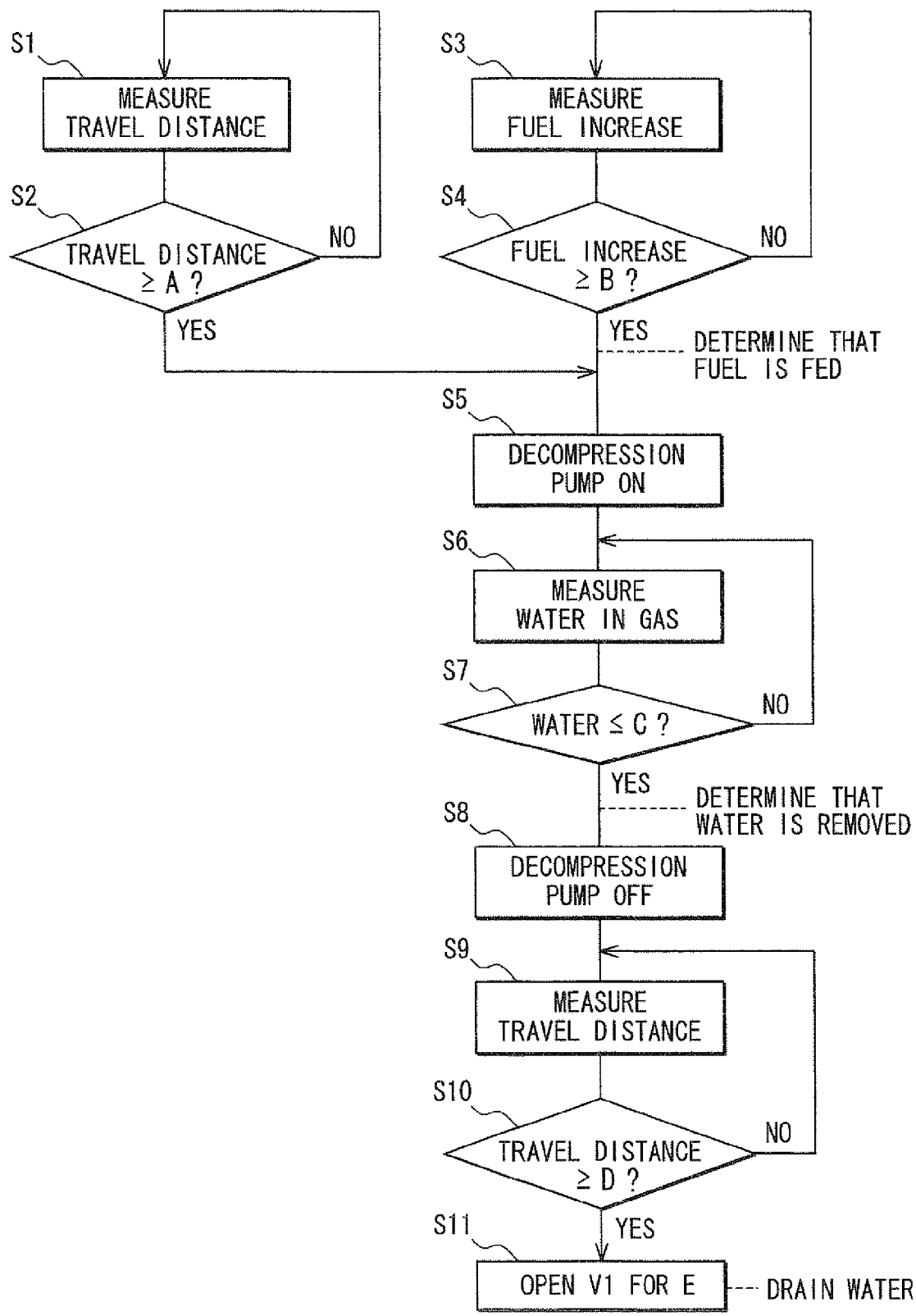
FIG. 5 is a flowchart illustrating workings of a control means according to the first embodiment.

S25 to step 28 (S28) are processing as the water separation performing means, which corresponds to S5 to S8 in FIG. 5. At S25, the electromagnetic valve V2 disposed in the negative pressure pipe 43 is opened to perform the water separation in the water separation portion 3 in the fuel tank T. Accordingly, negative pressure in the intake pipe is guided to the gas chamber 35 through the negative pressure pipe 43, and negative pressure is generated in the gas chamber 35 of the water separation portion 3. Consequently, the pressure difference between a liquid chamber 34 and the gas chamber 35 is made large. As a result, only water in the water layer including the alcohol component in the liquid chamber 34 passes through a porous substrate 32 and a separation membrane 33 of the component separation wall 31 in this order, and is separated in the gas chamber 35. Water is accumulated on the bottom of the gas chamber 35.

At step 26 (S26), water in a gas flow flowing through the negative pressure pipe 43 is measured using a water detecting means 7 disposed in the negative pressure pipe 43. At step 27 (S27), it is determined whether the measured water is equal to or smaller than a predetermined value C (e.g., 100 ppm). When it is determined that the water is equal to or smaller than the predetermined value C (Yes), control proceeds to S28. When it is determined that the water is not equal to or smaller than the predetermined value C (No), control returns to S26.

At S28, the electromagnetic valve V2 is closed to block the communication between the gas chamber 35 and the negative pressure portion of the intake pipe. Step 29 (S29) to step 31 (S31) are processing as the water drainage performing means, which corresponds to S9 to S11 in FIG. 5. At S29, a travel distance after the previous water drainage process is measured. At step 30 (S30), it is determined whether the travel distance measured at S29 is equal to or larger than a predetermined distance D (e.g., 1000 km). When it is determined that the travel distance is equal to or larger than the predetermined distance D (Yes), control proceeds to S31. When it is determined that the travel distance is not equal to or larger than the predetermined distance D (No), control returns to S29.

At S31, an electromagnetic valve V1 disposed in a drainage pipe 44, which is connected to the bottom of the gas chamber 35, is opened to drain water in the gas chamber 35. This state is continued for a predetermined time E (e.g., five minutes), and then the electromagnetic valve V1 is closed to stop the water drainage process.

In the second embodiment as well, the process by the water separation portion 3 is performed regularly or after refuel, to separate and drain only water in the fuel tank T. Thus, similar effects to the first embodiment are produced.

In the above embodiments, the examples, in which the water separation portion 3 for separating water mixed in alcohol fuel or alcohol mixed gasoline fuel is provided, are described. However, the present invention may be applied to biodiesel fuel and mixed fuel of biodiesel fuel and light oil, for example. Furthermore, it is not necessarily applied to these fuels, but is suitably used for other fuels into which water tends to be mixed, particularly fuel including components that tend to be dissolved in water, to produce a profound effect.

As above, according to the present invention, water mixed in fuel in the fuel tank is effectively separated and drained by the water separation unit. As a result, failures due to the incorporation of water into fuel are prevented, and discharge of the fuel component incorporated in the water layer is prevented. In consequence, economic efficiency is improved.

Additional advantages and modifications will readily occur to those skilled in the art. The invention in its broader terms is therefore not limited to the specific details, representative apparatus, and illustrative examples shown and described.

What is claimed is:

1. A water separation unit for separating water from liquid fuel, which includes the water as impurities, the unit comprising:
   a water separation portion, wherein:
   the water separation portion includes a component separation wall, a liquid chamber, and a gas chamber;
   the component separation wall divides the water separation portion between the liquid chamber and the gas chamber;

the liquid fuel is led to the liquid chamber;

the component separation wall includes a separation membrane, which the water selectively permeates to be separated from the liquid fuel in the liquid chamber;

the water, which passes through the component separation wall, is temporarily stored in the gas chamber; and the liquid chamber is located above the gas chamber in a vertical direction of the water separation portion;

a negative pressure inlet that opens on a sidewall of the gas chamber;

a negative pressure generator connected to the negative pressure inlet for generating negative pressure in the gas chamber; and a water draining means for selectively draining the water temporarily stored in the gas chamber, at a bottom portion of the gas chamber.

2. The water separation unit according to claim 1, wherein the component separation wall further includes a porous substrate, which supports the separation membrane.

3. The water separation unit according to claim 1, wherein the separation membrane is a zeolite membrane.

4. The water separation unit according to claim 1, wherein the liquid fuel is one of:
alcohol fuel; and
gasoline fuel, into which alcohol is mixed.

5. The water separation unit according to claim 1, wherein the liquid fuel is one of:
biodiesel fuel; and
mixed fuel of biodiesel fuel and light oil.

6. A fuel supply apparatus for supplying liquid fuel stored in a fuel tank to an internal-combustion engine through a fuel supply passage, the apparatus comprising the water separation unit recited in claim 1, wherein:
the water separation portion is disposed integrally in one of the fuel tank and a passage leading from a filler opening for the liquid fuel into the fuel tank; and
the liquid chamber has an opening, through which the liquid fuel in the fuel tank flows into the component separation wall via the liquid chamber.

7. The fuel supply apparatus according to claim 6, further comprising:
a pipe connected to the negative pressure inlet, wherein the negative pressure generator is disposed in the pipe.

8. The fuel supply apparatus according to claim 7, wherein the negative pressure generating means generates negative pressure in the gas chamber using one of:
negative pressure in an intake pipe of the internal-combustion engine; and
a decompression pump.

9. The fuel supply apparatus according to claim 7, further comprising a control means for controlling the water separation portion, wherein the control means includes:
a determining means for determining whether a travel distance of the internal-combustion engine is equal to or larger than a predetermined distance; and
a water separation performing means for actuating the negative pressure generator to generate negative pressure in the gas chamber, when the determining means determines that the travel distance is equal to or larger than the predetermined distance.

10. The fuel supply apparatus according to claim 9, wherein the control means (6) further includes:
a water detecting means for measuring the water in gas flowing through the pipe; and
a water drainage performing means for actuating the water draining means to drain the water in the gas chamber, when an amount of the water measured by the water detecting means is equal to or smaller than a predetermined value.

11. The fuel supply apparatus according to claim 7, further comprising a control means for controlling the water separation portion, wherein the control means includes:
a determining means for determining whether there is an increase in an amount of the liquid fuel in the fuel tank; and
a water separation performing means for actuating the negative pressure generating means to generate negative pressure in the gas chamber, when the determining means determines that there is the increase in the amount of the liquid fuel.

12. The fuel supply apparatus according to claim 11, wherein the control means further includes:
a water detecting means for measuring the water in gas flowing through the pipe; and
a water drainage performing means for actuating the water draining means to drain the water in the gas chamber, when an amount of the water measured by the water detecting means is equal to or smaller than a predetermined value.

* * * * *